United States Patent

[11] 3,597,996

[72] Inventors Harry A. Gouwens
South Holland;
Thomas R. Rehberg, Chicago Heights, both of, Ill.
[21] Appl. No. 27,313
[22] Filed Apr. 10, 1970
[45] Patented Aug. 10, 1971
[73] Assignee General Electric Company

[54] RECESSED CONTROL KNOB FOR COOKING EQUIPMENT
7 Claims, 4 Drawing Figs.
[52] U.S. Cl. .................................................. 74/553,
74/548, 99/422, 116/124 R
[51] Int. Cl. .................................................. G05g 1/10
[50] Field of Search .................................... 74/553,
552, 548; 16/121; 287/53 H; 99/422; 116/115,
115.5, 124 R, 133

[56] References Cited
UNITED STATES PATENTS
2,294,686  9/1942  Newman ...................... 287/53 H
2,868,025  1/1959  Spear .......................... 74/553 UX

*Primary Examiner*—William F. O'Dea
*Assistant Examiner*—F. D. Shoemaker
*Attorneys*—Arthur E. Fournier, Jr., David M. Schiller, Joseph B. Forman, Frank L. Neuhauser and Oscar B. Waddell ABSTRACT: A recessed control knob assembly, preferably for use with commercial cooking equipment having a control panel, including a generally cup-shaped skirt positioned in a suitable recess provided therefor in the control panel, the cup-shaped skirt having a base with outwardly and forwardly sloping sidewalls terminating in an annular flange, the base of the skirt having a knob secured thereto which projects forwardly thereof but which is entirely contained within the skirt with the forward end surface of the knob displaced slightly inwardly of a plane defined by the annular flange of the skirt so that the knob is protected against accidental jarring, suitable indicia being stamped or otherwise marked upon the annular flange of the skirt, and the knob being attached to a suitable thermostat or control, the knob and skirt being manually rotatable as a unit relative to the control panel.

Patented Aug. 10, 1971

3,597,996

INVENTORS
THOMAS R. REHBERG
HARRY A. GOUWENS
BY
ATTORNEY 3,597,996

1

RECESSED CONTROL KNOB FOR COOKING EQUIPMENT

BACKGROUND OF THE INVENTION

1. Field of the Invention

My invention relates to commercial cooking equipment, and more particularly to an improvement in control knob assemblies for cooking devices of the type having a vertical front panel on which the controls for the device are mounted.

2. Description of the Prior Art

For purposes of selecting the desired cooking temperature when using commercial cooking devices such as griddles, hotplates, deep-fat fryers, etc. such devices are commonly provided with a temperature control knob, the knob being suitably connected to a thermostat which controls the operation of the device's heat generating means. As is evident from the prior art, it has become the conventional practice to position the aforesaid temperature control knob on the vertical front wall of the device where the device is provided with a self-enclosing integral housing. Where the device comprises a drop-in unit mounted in a stainless steel counter or table whereby the latter counter or table becomes in essence a housing for the unit, the temperature control knob is commonly found positioned on a control panel located in the vertical front apron of the counter or table. By positioning the temperature control knob at the front of the device in either of the aforesaid manners, the knobs are located within easy reach of the chef operating the particular cooking device. On the other hand in such a position the knobs project forwardly from the front of the device and are thus exposed to be extremely vulnerable to being accidentally bumped into by a chef working in front of the equipment. Such treatment is injurious to both the knob, and more importantly, the thermostat or control to which the knob is attached.

One approach which has been taken in an effort to eliminate the aforementioned problem involves affixing guard rings to the front of the device surrounding the knob. This protects the knob but makes the use of the knob more difficult while still leaving objects projecting into the aisle in front of the cooking device. Another less than satisfactory approach which has been tried is to recess the front control panel into the housing of the device, or the apron of the counter or table depending on the particular type of installation being utilized. The primary disadvantage of this latter approach is that due to the relatively low position of the knob relative to the eye of the operator, it is very difficult to read the printed matter stamped or otherwise marked on the dial portion of the knob assembly.

OBJECTS OF THE INVENTION

It is therefore an object of the present invention to provide a novel and improved control knob assembly for cooking equipment which does not project beyond the front wall surface of the cooking equipment to any appreciable extent and yet which has printed matter so disposed such that it can be readily read by the operator.

It is another object of the present invention to provide such a control knob assembly for cooking equipment wherein the forward end surface of the knob is displaced slightly inwardly of a plane defined by the annular flange of the skirt of the control knob assembly surrounding the knob such that the knob is protected against being accidentally struck and damaged.

Yet a further object of the present invention is to provide such a control knob assembly for cooking equipment which is relatively inexpensive to manufacture, easy to install, while still being capable of being employed with various different types of cooking equipment.

SUMMARY OF THE INVENTION

In accordance with the preferred form of the invention there is provided a control knob assembly for use primarily in the control panels of cooking devices. The control knob assembly which is positioned in a recess in the control panel includes a generally cup-shaped skirt having a base with forwardly extending side walls terminating in an annular flange in juxtaposed relation to the front surface of the control panel. A knob is secured to the base of the skirt and projects forwardly but is entirely contained within the skirt. The forward end surface of the knob is displaced slightly inwardly of a plane defined by the annular flange of the skirt so that the knob is protected against accidental jarring. Suitable indicia is stamped or otherwise marked upon the annular flange of the skirt and the knob is attached to a suitable thermostat or control. The knob and skirt rotate as a unit relative to the control panel.

The invention will be more fully understood from the following detailed description and its scope will be pointed out in the appended claims.

DESCRIPTION OF A PREFERRED EMBODIMENT

Figure 1:
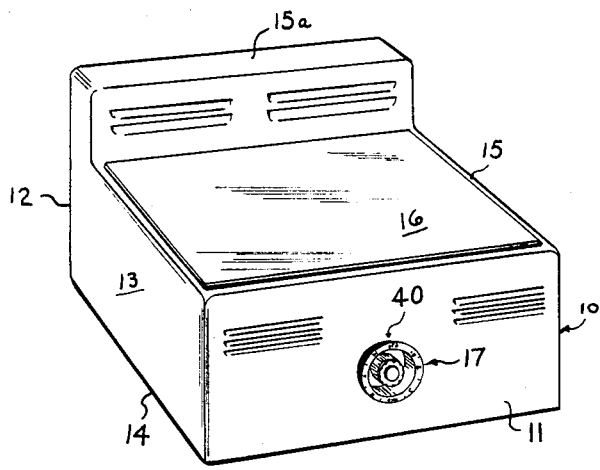
FIG. 1 is a perspective view of a commercial cooking device incorporating a recessed control knob assembly in accordance with the present invention.

Referring to FIG. 1 of the drawing, the invention is shown as incorporated in a commercial cooking device generally designated by reference numeral 10. For purposes of describing the invention, the particular type of commercial cooking device which has been selected for illustration comprises what is commonly referred to in the art as a griddle, the latter primarily being for use in frying various food products.

The griddle 10 includes front and rear walls 11 and 12, respectively, a pair of opposed sidewalls 13, a bottom wall 14, and a top wall 15 having an enclosed rectangular portion 15a projecting upwardly from the top wall 15 adjacent the rear wall 12. Suitably supported on the top wall 15 in a manner well-known in the art there is provided a cooking surface comprising a substantially flat, rectangular heat conducting member 16. Although not shown in the drawing in the interest of simplification of illustration and inasmuch as it is not directly related to the present invention, it is nevertheless to be understood that the griddle 10 may be provided with a removable grease catching container. Commonly such containers when employed are detachably mounted in an opening suitably provided therefor (not shown) in the top wall 15 of the griddle 10, i.e., adjacent the rear edge of member 16 as viewed with reference to FIG. 1 of the drawing in juxtaposed relation to the upstanding portion 15a of top wall 15.

The heat conducting member 16 of griddle 10 is preferably electrically heated by one or more suitable heating elements (not shown) which may be suitably secured to the bottom surface of the member 16 in the manner disclosed for example in U.S. Pat. No. 3,439,152 which is assigned to the same assignee as the present invention. The heating elements have not been illustrated in the drawing inasmuch as they are well-known to those skilled in the art and form no part of the present invention. The temperature of the heat conducting member 16 is controlled by means of a temperature control assembly 17 centrally located on front wall 11 of griddle 10.

In accord with the invention the control assembly 17 is positioned on the front wall 11 so that it does not project forwardly therefrom to any appreciable extent and has indicia so located as to be readily viewable by the operator. As best understood with reference to FIGS. 2 and 3 of the drawing, the temperature control assembly 17 illustrated therein includes a generally cup-shaped skirt 18 positioned in a suitable recess 19 provided therefor in the front wall 11 of griddle 10. The cup-shaped skirt 18 has a base 20 with forwardly extending side walls 21 terminating in an annular flange 22. Attached to the base 20 of cup-shaped skirt 18 in a manner to be more fully described hereinafter there is provided a circular control knob 23.

Figure 4:
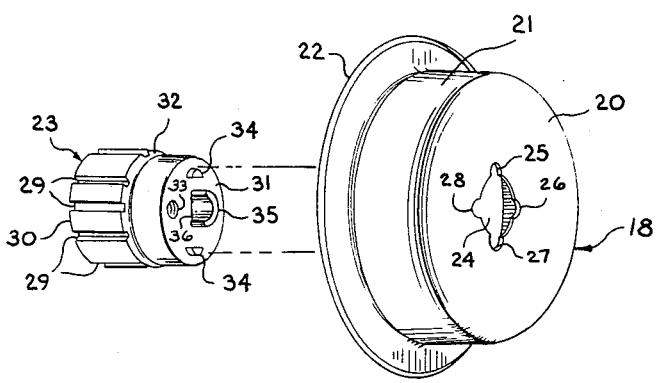
FIG. 4 is an exploded perspective view of the control knob and skirt of the recessed control knob assembly of FIG. 2 in accordance with the present invention.

Referring to FIG. 4 of the drawing, it can be seen that the base 20 of cup-shaped skirt 18 is provided with a substantially circular opening 24 located at the approximate center thereof. At approximately 90° intervals around its circumference, the opening 24 is provided with a plurality of relatively small, as compared to the size of opening 24, semicircular openings 25, 26, 27, and 28, respectively, for a purpose to be more fully set forth hereinafter.

Extending inwardly around its circumference, the knob 23 is preferably provided with a plurality of knurls 29 to facilitate grasping and rotating the knob 23. For essentially the same reason the head 30 of knob 23 is preferably slightly enlarged relative to the base 31 thereof resulting in a flange 32 being created substantially midway along the length of knob 23. The base 31 of knob 23 is provided with a pair of opposed threaded holes 33 (only one of which is shown in FIG. 4). The spacing between the holes 33 corresponds to the spacing between opposed semicircular openings 25 and 27, and 26 and 28 of cup-shaped skirt 18. In addition base 31 is provided with a pair of opposed semicircular projections 34 which correspond in configuration to the semicircular openings 25, 26, 27, and 28 of cup-shaped skirt 18 such as to be receivable in the opposed pair of openings 25 and 27, or 26 and 28. Finally the base 31 of knob 23 is provided with a centrally located semicircular projection 35 which guards the entrance to a similarly configured semicircular slot 36 extending inwardly a suitable distance into the body portion of knob 23.

To affix the circular knob 23 to the cup-shaped skirt 18, the pair of semicircular projections 34 on the base 31 of knob 23 are inserted into either the pair of opposed openings 25 and 27, or the pair of opposed openings 26 and 28 provided in the base 20 of skirt 18. For purposes of further description of the assembly of the knob 23 to the skirt 18, let us assume that as indicated in FIG. 4 of the drawing, the projections 34 are received in openings 25 and 27. With the pair of projections 34 so positioned, the pair of threaded holes 33 provided in base 31 of knob 23 thereby simultaneously become aligned with the pair of semicircular openings 26 and 28 provided in the base 20 of skirt 18. Suitable fastening means such as the screws 37 illustrated in FIG. 3 of the drawing are then inserted through the semicircular openings 26 and 28 of skirt 18 and are screwed into the threaded holes 33 of knob 23 thereby securely affixing the knob 23 to the skirt 18. When so assembled, the projection 35 formed on the base 31 of knob 23 projects through the opening 24 provided in the skirt 18 where it is utilized for a purpose to be described hereinafter. It can thus be seen that by virtue of the interengagement of projections 34 with openings 25 and 27, and screws 37 with the holes 33 of knob 23 and the openings 26 and 28 of skirt 18, any rotation of the knob 23 will be imparted to the skirt 18 such that the knob 23 and the skirt 18 will rotate effectively as a unit with essentially no relative movement, i.e., slippage, occurring therebetween.

Figure 3:
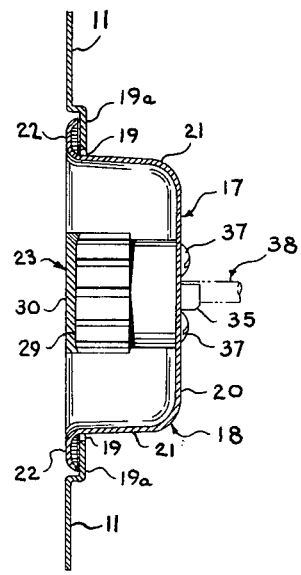
FIG. 3 is a cross-sectional view of the recessed control knob assembly of FIG. 2 taken substantially on the line of section 3-3.

With the knob 23 and skirt 18 having been assembled in the foregoing manner into a unit, this assembly is then ready for mounting in the recess 19 suitably provided therefor in the front wall 11 of griddle 10. To accomplish this mounting of the knob and skirt assembly, the base 20 and side walls 21 of the skirt 18 are inserted into the recess 19 until the annular flange 22 of the skirt 18 is located in juxtaposed relation to the surface of front wall 11 bordering the recess 19 as illustrated in FIG. 3 of the drawing. Preferably the front wall 11 of griddle 10 is provided with an indented flange portion 19a defining the circumference of the recess 19. The depth of the indentation is chosen to be at least equal in depth to the thickness of the annular flange 22 of the skirt 18 in order to ensure that the annular flange 22 does not project beyond the surface of front wall 11 when the skirt 18 is positioned within recess 19.

In accordance with conventional practice, a rotatable shaft 38 comprising an operating portion of a suitable thermostat or other form of heating control (not shown) is positioned inwardly of the front wall 11 of griddle 10 in the approximate center of recess 19. The thermostat or control in a manner well known to those skilled in the art is connected to the previously described heating elements so as to constitute a means for selecting a desired temperature for the member 16 in accordance with the type of food product to be cooked thereon as well as a means for maintaining this heating temperature in the member 16 for the duration of the cooking cycle.

At least the end portion of the rotatable shaft 38 has a semicircular configuration corresponding to that of the projection 35 and slot 36 of base 31 of knob 23. Accordingly, when the combined knob and skirt assembly is being inserted into the recess 19 provided in the front wall 11 of griddle 10, the end portion of rotatable shaft 38 is received into the slot 36 with a friction type fit. It will of course be understood that as the knob and skirt assembly is being inserted into the recess 19, the assembly may have to be rotated until the semicircular slot 36 becomes aligned with the semicircular end portion of the shaft 38. For by virtue of the semicircular configuration thereof, it is only when the semicircular portions of the slot 36 and shaft 38 are properly aligned that the shaft 38 will be capable of being inserted into the slot 36, the combined knob and skirt assembly will remain mounted on the shaft 38 by virtue of the friction fit existing between the sidewalls of slot 36 and the end portion of shaft 38.

Figure 2:
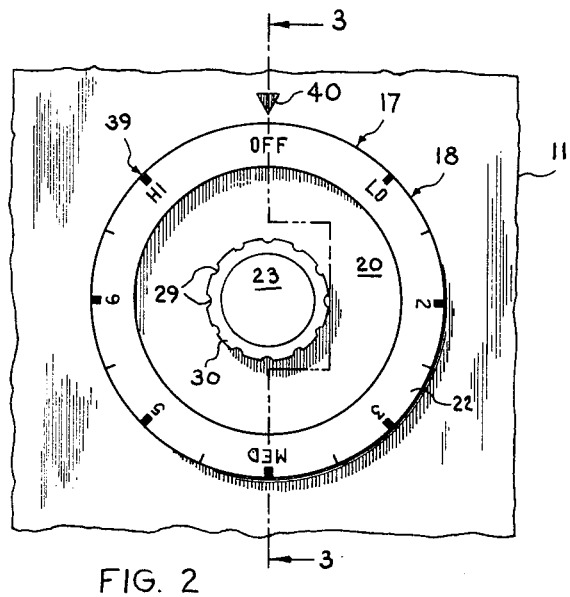
FIG. 2 is a partial front elevational view of the commercial cooking device of FIG. 1 illustrating a recessed control knob assembly in accordance with the present invention on a slightly enlarged scale.

As depicted in FIGS. 1 and 2 of the drawing, the annular flange 22 of cup-shaped skirt 18 is provided with suitable indicia 39 which is either stamped or otherwise marked thereon. Likewise, the front wall 11 of griddle 10 is provided with a suitable mark 40 whereby the particular one of the indicia 39 on the annular flange 22 which is opposite the mark 40 indicates the desired heating condition for the heat conducting member 16. Thus, as illustrated for example in FIG. 2 of the drawing where the legend "OFF" on the annular flange 22 is depicted positioned adjacent the inverted triangle which comprises the mark 40 being used as an indicator on the front wall 11, the heat generating means (not shown) for the heat conducting member 16 would be in the OFF condition. Similarly, if the knob 23 is rotated 180° from the position depicted in FIG. 2 of the drawing such that the legend "MED" on the annular flange 22 were now adjacent the inverted triangle 40, this would signify that the heat conducting member 16 was being heated to and would thereafter be maintained at a MEDIUM heat.

Because the temperature control assembly 17 operates to control the cooking temperature of the heat conducting member 16, it is necessary when first mounting the knob and skirt assembly in the recess 19 and on the end portion of shaft 38 to ensure that the relationship which exists between the actual operating condition of the heat generating means associated with shaft 38 and the condition thereof indicated by the particular one of the indicia 39 on annular flange 22 which is opposite the mark 40 is correct. To this end, it is desirable when mounting the knob and skirt assembly on shaft 38 to first rotate the shaft 38 to the position wherein the heat generating means connected thereto will be in the OFF condition. Thereafter, the semicircular portion of the knob 23 is aligned with the semicircular portion of the shaft 38. Whereupon, the base 20 and side walls 21 of the skirt 18 are inserted into the recess 19 and the knob 23 is concomitantly slid onto shaft 38. When so mounted, the legend "OFF" on the annular flange 22 should be positioned directly below the inverted triangle 40 on front wall 11. Should this condition be found not to exist, the knob and skirt assembly are removed from the recess 19 and the shaft 38, and the screws 37 are unscrewed from the threaded holes 33. The knob 23 is then disassociated from the skirt 18. That is, the projections 34 of the knob 23 are disengaged from the openings 25 and 27. The knob 23 may then be rotated and reassembled with the skirt 18 such that when the knob and skirt assembly are once again inserted into the recess 19 and mounted on the end portion of shaft 38, the legend "OFF" on the annular flange 22 of the skirt 18 will be positioned directly below the mark 40. It is of course to be recognized that in reassembling the knob 23 and the skirt 18 it may be necessary to position the projections 34 on the base 31 of knob 23 in the openings 26 and 28 rather than the openings 25 and 27 whereby the holes 33 will be aligned with openings 25 and 27 such that the screws 37 will pass through the openings 25 and 27 rather than the openings 26 and 28 in base 20 of skirt 18 as previously described. Since each of the openings 25, 26, 27, and 28 have the same dimensions, this of course poses no problem. Thus, it is seen that the various projections which the base 31 of the knob 23 is provided with as well as the openings 25, 26, 27, and 28 of base 20 of skirt 18 with which the aforesaid projections cooperate constitute a form of aligning means ensuring that once the proper relationship between the legend bearing annular flange 22 of skirt 18 and the rotatable shaft 38 of the heat generating means has been established that this relationship will continue to be maintained.

Therefore, in accordance with the present invention there has been provided a control knob assembly for cooking equipment which has no portion thereof projecting beyond the front wall surface of the cooking equipment. Further, this control knob assembly when mounted on suitable cooking equipment is such that the forward end surface of the knob is displaced slightly inwardly of a plane defined by the annular flange of the cup-shaped skirt surrounding the knob such that the knob is protected against being accidentally struck and damaged. Moreover, the printed matter by being located on the annular flange of the cup-shaped skirt is positioned so that it may be readily read by the chef. Finally, there has been provided a control knob assembly for cooking equipment which is relatively inexpensive to manufacture, easy to install, yet which is also capable of being employed with various different types of cooking devices.

While only one embodiment of our invention has been illustrated, it will be appreciated that many modifications thereof may readily be made by those skilled in the art. For example, as previously mentioned the control knob assembly in accordance with the present invention may be employed with devices which have their own housing as in the case of the device illustrated in the drawing, or with devices which are intended to be inserted into an opening provided therefor in a suitable stainless steel counter or table (not shown). Also, rather than having the projections 34 and holes 33 on base 31 of knob 23 arranged in opposing pairs, i.e., arranged 180°apart along the circumference of base 31, they could be arranged such that the projections 34 are spaced only 90°apart and the holes 33 are likewise spaced only 90°apart. This would mean that with reference to FIG. 4 of the drawing, the projections 34 might be received in openings 25 and 26 in the base of skirt 18 and the holes 33 would be aligned with openings 27 and 28. We therefore intend by the appended claims to cover the above modifications as well as all other modifications which fall within the true spirit and scope of our invention.

What we claim as new and desire to secure by Letters Patent of the United States is:

1. For use with cooking equipment having heat generating means and control means therefore and at least one enclosing wall surface, a control knob assembly comprising:
   a. a knob having an elongated body, said body including grasping means formed at one end thereof and a base formed at the other end thereof;
   b. said base of said knob including mounting means;
   c. securing means receivable in said mounting means of said base of said knob;
   d. a cup-shaped skirt including a base, sidewalls extending forwardly from said base of said skirt, and an annular flange formed at the outer end of said forwardly extending sidewalls;
   e. said base of said cup-shaped skirt including means cooperating with said mounting means of said base of said knob and said securing means to amount said base of said knob on said base of said cup-shaped skirt with the forward end of said grasping means of said knob displaced slightly inwardly of a plane defined by said annular flange of said cup-shaped skirt to minimize the possibility of said knob being accidentally struck and damaged;
   f. said cup-shaped skirt with said knob mounted thereto being supported in a recess suitably provided therefor in said enclosing wall surface of said cooking equipment with said annular flange of said cup-shaped skirt in juxtaposed relation to said enclosing wall surface of said cooking equipment and with said cup-shaped skirt and said knob mounted thereto capable of being rotated as a unit relative to said enclosing wall surface of said cooking equipment; and
   g. said control knob assembly including connection means for connecting said control knob assembly to said control means of said cooking equipment when said cup-shaped skirt with said knob mounted thereto is supported in said recess of said enclosing wall surface of said cooking equipment.

2. For use with cooking equipment having heat generating means and control means therefor and at least one enclosing wall surface, a control knob assembly as defined in claim 1 wherein:
   a. said grasping means of said body of said knob includes a plurality of spaced knurls formed along the circumference of said elongated body and extending approximately half the length of said body;
   b. said base of said knob includes aligning means; and
   c. said annular flange of said cup-shaped skirt includes indicia marked at spaced intervals along the circumference of said annular flange.

3. For use with cooking equipment having heat generating means and control means therefor and at least one enclosing wall surface, a control knob assembly as defined in claim 2 wherein:
   a. said mounting means of said base of said knob comprises a pair of threaded holes extending from the base of said knob inwardly into said body of said knob;
   b. said securing means comprises a pair of screws threaded into said pair of threaded holes of said base of said knob; and
   c. said aligning means of said base of said knob comprises a pair of semicircular projections projecting outwardly from said base of said knob.

4. For use with cooking equipment having heat generating means and control means therefor and at least one enclosing wall surface, a control knob assembly as defined in claim 1 wherein:
   a. said base of said cup-shaped skirt includes an opening substantially centrally located therein;
   b. said sidewalls of said cup-shaped skirt are slightly longer in length than the length of said elongated body of said knob; and
   c. said connection means of said control knob assembly comprises a semicircular slot extending from said base of said knob inwardly into said body of said knob and a semicircular guide for said semicircular slot, said semicircular guide projecting through said opening in said base of said cup-shaped skirt when said base of said knob is mounted on said base of said cup-shaped skirt.

5. For use with cooking equipment having heat generating means and control means therefor and at least one enclosing wall surface, a control knob assembly comprising:
   a. a knob having an elongated body, said body including an enlarged head portion formed at one end of said body for ease in grasping said knob and a slightly smaller base portion formed at the other end of said body;

b. said base portion of said knob including a pair of threaded holes formed therein and extending from said base portion inwardly into said body of said knob;

c. a pair of screws threadable into said pair of threaded holes formed in said base portion of said knob;

d. a cup-shaped skirt including a base, sidewalls extending forwardly from said base of said skirt and an annular flange formed at the outer end of said forwardly extending sidewalls;

e. said sidewalls of said cup-shaped skirt being slightly longer in length than the length of said elongated body of said knob;

f. said annular flange of said cup-shaped skirt including indicia marked at spaced intervals along the circumference of said annular flange;

g. said base of said cup-shaped skirt including an opening substantially centrally located therein;

h. said opening in said base of said cup-shaped skirt having at least one pair of substantially smaller semicircular openings formed along the circumference thereof;

i. said pair of screws being passed through said pair of substantially smaller semicircular openings located along the circumference of said opening in said base of said cup-shaped skirt and threaded into said pair of threaded holes in said base portion of said knob to mount said base portion of said knob on said base of said cup-shaped skirt with the forward end of said head portion of said knob displaced slightly inwardly of a plane defined by said annular flange of said cup-shaped skirt to minimize the possibility of said knob being accidentally struck and damaged;

j. said cup-shaped skirt with said knob mounted thereto being supported in a recess suitably provided therefor in said enclosing wall surface of said cooking equipment with said annular flange of said cup-shaped skirt in juxtaposed relation to said enclosing wall surface of said cooking equipment and with said cup-shaped skirt and said knob mounted thereto capable of being rotated as a unit relative to said enclosing wall surface of said cooking equipment; and k. said base portion of said knob including connection means for connecting said knob to said control means of said cooking equipment when said cup-shaped skirt with said knob mounted thereto is supported in said recess of said enclosing wall surface of said cooking equipment.

6. For use with cooking equipment having heat generating means and control means therefor and at least one enclosing wall surface, a control knob assembly as defined in claim 5 wherein:

a. said base portion of said knob includes aligning means;

b. said opening in said base of said cup-shaped skirt has at least another pair of substantially smaller semicircular openings formed along the circumference thereof;

c. said aligning means comprises a pair of semicircular projections projecting outwardly from said base portion of said knob; and d. said pair of semicircular projections are received in said another pair of substantially smaller semicircular openings in said base of said cup-shaped skirt when said base portion of said knob is mounted on said base of said cup-shaped skirt.

7. For use with cooking equipment having heat generating means and control means therefor and at least one enclosing wall surface, a control knob assembly as defined in claim 5 wherein:

a. said connection means of said base portion of said knob comprises a semicircular slot extending from said base portion of said knob inwardly into said body of said knob and a semicircular guide for said semicircular slot; and b. said semicircular guide projects through said opening in said base of said cup-shaped skirt when said base portion of said knob is mounted on said base of said cup-shaped skirt.